(12) United States Patent
Lee et al.

(10) Patent No.: US 10,954,420 B2
(45) Date of Patent: Mar. 23, 2021

(54) CURABLE MODIFIED PETROLEUM RESIN, AND PREPARATION METHOD AND USE THEREOF

(71) Applicant: KOLON INDUSTRIES, INC., Seoul (KR)

(72) Inventors: Je Min Lee, Yongin-si (KR); Jae Kyung Hwang, Yongin-si (KR); Wan Jae Lee, Yongin-si (KR); Myung Jong Kim, Yongin-si (KR); Won Seok Gong, Yongin-si (KR); Jun Hyo Park, Yongin-si (KR)

(*) Notice: Subject to any disclaimer, the term of this patent is extended or adjusted under 35 U.S.C. 154(b) by 193 days.

(21) Appl. No.: 16/335,122

(22) PCT Filed: Sep. 22, 2017

(86) PCT No.: PCT/KR2017/010488
§ 371 (c)(1),
(2) Date: Mar. 20, 2019

(87) PCT Pub. No.: WO2018/062781
PCT Pub. Date: Apr. 5, 2018

(65) Prior Publication Data
US 2019/0211239 A1 Jul. 11, 2019

(30) Foreign Application Priority Data

Sep. 27, 2016 (KR) .................. 10-2016-0123707

(51) Int. Cl.

| C09J 143/04 | (2006.01) |
|---|---|
| C09J 175/04 | (2006.01) |
| C09J 133/08 | (2006.01) |
| C08L 57/02 | (2006.01) |
| C08L 57/06 | (2006.01) |
| C09J 157/02 | (2006.01) |
| C08F 240/00 | (2006.01) |
| C08L 33/12 | (2006.01) |
| C08L 75/04 | (2006.01) |

(52) U.S. Cl.
CPC ........... *C09J 143/04* (2013.01); *C08F 240/00* (2013.01); *C08L 57/02* (2013.01); *C08L 57/06* (2013.01); *C09J 133/08* (2013.01); *C09J 157/02* (2013.01); *C09J 175/04* (2013.01); *C08L 33/12* (2013.01); *C08L 75/04* (2013.01)

(58) Field of Classification Search
CPC .......... C08L 23/10; C08L 23/12; C08L 23/14; C08L 23/142; C08L 23/145; C08L 23/147; C08L 23/16; C08L 23/18; C08L 23/20; C08L 23/22; C08L 23/24; C08L 57/00; C08L 57/02; C08L 57/06; C09J 143/00; C09J 143/02; C09J 143/04; C08F 10/00; C08F 10/02; C08F 10/04; C08F 10/06; C08F 10/08; C08F 10/10; C08F 10/14; C08F 240/00
See application file for complete search history.

(56) References Cited

U.S. PATENT DOCUMENTS

| 4,759,992 A | 7/1988 | Tomko et al. |
|---|---|---|
| 5,824,718 A | 10/1998 | Penfold et al. |
| 5,994,474 A | 11/1999 | Wey et al. |
| 6,646,067 B2 | 11/2003 | Lewtas et al. |
| 8,101,697 B2 | 1/2012 | Pawlow et al. |
| 2005/0043455 A1 | 2/2005 | Hohner |
| 2012/0288721 A1 | 11/2012 | Cho et al. |
| 2017/0218131 A1* | 8/2017 | Son ................ C08F 232/08 |

FOREIGN PATENT DOCUMENTS

| CN | 101628956 A | 1/2010 | |
|---|---|---|---|
| CN | 103214195 A | 7/2013 | |
| EP | 0773243 A1 | 5/1997 | |
| EP | 0889107 A2 | 1/1999 | |
| EP | 0944670 A1 | 9/1999 | |
| JP | S63-108015 A | 5/1988 | |
| JP | 07-207076 A | 8/1995 | |
| JP | 11-080698 A | 3/1999 | |
| JP | H11-079796 A | 3/1999 | |
| KR | 20010087846 A | 9/2001 | |
| KR | 10-0674593 B1 | 1/2007 | |
| KR | 10-2008-0039407 A | 5/2008 | |
| KR | 10-1174019 B1 | 8/2012 | |
| KR | 10-1305438 B1 | 9/2013 | |
| KR | 10-2016-0016677 A | 2/2016 | |
| WO | 98/26001 A1 | 6/1998 | |
| WO | 2005/100501 A1 | 10/2005 | |
| WO | 2015/153059 A2 | 10/2015 | |
| WO | WO-2016018131 A1 * | 2/2016 | ............ C08G 77/42 |

OTHER PUBLICATIONS

Office Action issued by Japanese Patent Office dated Jan. 21, 2021.
Office Action Issued by Korea Patent Office dated Dec. 15, 2020.

* cited by examiner

*Primary Examiner* — Christopher M Rodd
(74) *Attorney, Agent, or Firm* — Harvest IP Law, LLP (57) ABSTRACT

Provided is a curable petroleum resin, and a preparation method and a use thereof, the curable petroleum resin comprising a repeating unit derived from a petroleum resin monomer, a repeating unit derived from a silane monomer and a repeating unit derived from a C3-C20 alpha-olefin monomer. The curable petroleum resin is used as an additive in a reactive polyolefin-based adhesive composition to increase the adhesive strength to a polyolefin-based substrate used for various parts.

12 Claims, 2 Drawing Sheets

CURABLE MODIFIED PETROLEUM RESIN, AND PREPARATION METHOD AND USE THEREOF

TECHNICAL FIELD

The present application claims the benefit of Korean Patent Application No. 10-2016-0123707, filed on Sep. 27, 2016 with the Korean Intellectual Property Office, the disclosure of which is incorporated by reference in its entirety.

The present invention relates to a curable modified petroleum resin, a preparation method and a use thereof.

BACKGROUND ART

Materials used for the automobile include non-ferrous metals such as aluminum, and polymer materials such as rubber and plastic, in addition to steel. The materials for the automobile are being replaced by plastic, engineering plastic, rubber, thermoplastic elastomer, etc. for the parts that were conventionally made of steel and non-ferrous metals, etc. in order to reduce the weight of materials. Among them, polyolefin-based general-purpose plastics such as polypropylene are most commonly used.

Since the polyolefin-based general-purpose plastics are lightweight and have the advantages of low cost, excellent chemical resistance and moldability, they are used for the large parts such as the bumper and instrument panel of the automobile or the interior material such as the door trim and the dashboard. Among the polyolefin-based resins, polypropylene is the most popular interior material for the automobile.

For the assembly of plastic materials, various types of adhesives such as a solvent based adhesive, a water base adhesive, a hot-melt adhesive, a reactive adhesive and a pressure sensitive adhesive are used. Among them, there is a growing interest in the reactive adhesive.

The reactive adhesive is cured by heat, light or a curing agent, and has the advantages of being easy to control the curing reaction and having a strong adhesive force.

The reactive adhesive has several types depending on the type of base polymer. Among them, the polyurethane reactive adhesive (PUR), which is mainly composed of urethane-based resin, is widely used. The polyurethane reactive adhesive is applied to the substrate and then reacted with water contained in the air and bonded through a crosslinking reaction (or curing reaction), and the polyurethane reactive adhesive has the advantage of forming a flexible adhesive coating. However, since high-cost isocyanate-based compounds as main raw materials and toxic substances such as tin as catalysts are included, there is a growing demand for safe and environmentally friendly adhesives to replace them.

A polyolefin reactive adhesive (POR) is proposed to meet these requirements.

The polyolefin reactive adhesive is low cost and has excellent adhesive force, contains low density/high density polyethylene resin as base polymer, or crystalline/amorphous polypropylene resin as main component, and is used in combination with the catalyst for the curing reaction and the petroleum resin for improving adhesive force.

For the petroleum resin for improving the adhesive force, mainly C5-based petroleum resin or C9-based petroleum resin is used as general petroleum resin or as hydrogenated petroleum resin. For example, Korean Patent Application No. 10-1174019 discloses an aliphatic petroleum resin as a tackifier resin in an adhesive composition containing an amorphous polyolefin.

Recently, in order to increase the curing speed and improve the adhesive force, a method of using silane-based compounds such as silane coupling agent has been proposed. Korean Patent Application No. 10-1305438 discloses an adhesive containing alkoxysilane compounds for bonding polyurethane and aluminum material used as an interior material of the automobile.

These silane-based compounds may be simply mixed and added or used in modified form to a base polymer. Specifically, US Patent Application Publication No. 2005-0043455, European Patent Application No. 0 944 670, International Publication Application Publication No. WO 2005/100501, and U.S. Pat. No. 5,824,718 disclose compositions including various silane-based compounds. However, since the simple introduction method of the silane-based compound has a low grafting rate of the silane-based compound, the improvement of desired level in curing speed and the improvement effect of the adhesive force could not be obtained.

The present applicant has proposed a curable petroleum resin, in which a silane-based compound is introduced into a petroleum resin rather than a base polymer, through Korean Patent Application Publication No. 2016-0016677. The proposed petroleum resin was evaluated only for the possibility, by stating that the proposed petroleum resin has a double bond in the molecular structure and thus can be cured, thereby being used as a reactive adhesive. Therefore, when the petroleum resin with the silane-based compound was applied as an adhesive to a polyolefin-based substrate, a certain level of adhesive force could be obtained. However, the higher level of adhesive force was required.

The polyolefin-based substrate used as the interior material of the automobile is generally subjected to pre-treatment such as corona treatment, plasma treatment, or primer treatment before adhesive treatment in order to increase the adhesive force. This pre-treatment increases the manufacturing process of the automobile and increases the total production cost.

Since the most common cause of failure of the bonded area is in the preparation of adherend rather than adhesive strength and in the selection of an unsuitable adhesive, it is imperative to secure a suitable adhesive for the polyolefin-based material used as the interior material of the automobile.

Since the polyolefin-based substrate is a typical non-polar substrate, a method of temporarily polarizing the substrate by corona treatment is generally used to increase the adhesive force. However, this pre-treatment process has problems such as complicating the process and raising the overall cost.

PRIOR ART DOCUMENT

Patent Document

Korean Patent Application No. 10-1305438 (2013 Sep. 2), Adhesives for Bonding Polyurethane and Aluminum US Patent Application Publication No. 2005-0043455 (2005 Feb. 24), Modified polyolefin waxes European Patent Application No. 0 944 670 (2000 Nov. 22), ABRASION-RESISTANT, SILANE-CROSSLINKABLE POLYMER AND POLYMER BLEND COMPOSITIONS International Patent Application Publication No. WO 2005/100501 (2005 Oct. 27), Polyolefin adhesive compositions and articles made therefrom U.S. Pat. No. 5,824,718 (1998 Oct. 20), Silane-crosslinkable, substantially linear ethylene polymers and their uses Korean Patent Application Publication No. 2016-0016677 (2016 Feb. 15), Curable petroleum resin and its preparation method

DISCLOSURE

Technical Problem

As a result of extensive studies in view of the above, the inventors of the present invention have prepared a petroleum resin applicable to a reactive polyolefin-based adhesive composition, to increase the adhesive force with the polyolefin-based substrate without pre-treatment, and have confirmed that when a copolymer comprising a repeating unit derived from a petroleum resin monomer, a repeating unit derived from a silane monomer and a repeating unit derived from an alpha-olefin monomer is used as the petroleum resin, excellent adhesive force to polyolefin-based substrate after curing process can be secured.

Accordingly, it is an object of the present invention to provide a curable petroleum resin comprising a repeating unit derived from an alpha-olefin monomer.

In addition, it is another object of the present invention to provide a preparation method of the curable petroleum resin.

In addition, it is still another object of the present invention to provide a reactive adhesive composition comprising the curable petroleum resin.

Technical Solution

In order to achieve the above objects, the present invention provides a curable petroleum resin comprising a repeating unit derived from a petroleum resin monomer, a repeating unit derived from a silane monomer and a repeating unit derived from a C3-C20 alpha-olefin monomer.

The alpha-olefin monomer may be a linear or branched alpha-olefin monomer.

The linear alpha-olefin monomer may comprise one selected from the group consisting of propene, 1-butene, 1-pentene, 1-hexene, 1-heptene, 1-octene, 1-decene, 1-undecene, 1-dodecene, 1-tetradecene, 1-hexadecene, 1-itocene and combinations thereof, and preferably, 1-hexene, 1-octene, and 1-dodecene.

The branched alpha-olefin monomer may be one selected from the group consisting of isobutylene, 3-methyl-1-butene, 2-methyl-1-butene, 3-methyl-1-butene, 4-methyl-1-butene, 3-methyl-1-pentene, 4-methyl-1-pentene, 4-methyl-1-hexene, 5-methyl-1-hexene and combinations thereof.

The petroleum resin monomer may comprise one selected from the group consisting of mixed C5 fractions, mixed C9 fractions, dicyclopentadiene and mixtures thereof obtained from the cracking of naphtha.

The silane-based compound may comprise one selected from the group consisting of vinyltrimethylsilane, vinyltrimethoxysilane, vinyltriethoxysilane, triacetoxyvinylsilane, triphenylvinylsilane, tris(2-methoxyethoxy)vinylsilane, 3-(trimethoxysilyl)propyl methacrylate, γ-(meth)acryloxypropyl trimethoxysilane and mixtures thereof.

In addition, the present invention provides a preparation method of the curable petroleum resin prepared by copolymerizing a repeating unit derived from a petroleum resin monomer, a repeating unit derived from a silane monomer and a repeating unit derived from a C3-C20 alpha-olefin monomer.

In addition, the present invention provides a reactive adhesive composition comprising the curable petroleum resin as described above.

Advantageous Effects

The curable petroleum resin according to the present invention can be cured by a double bond existing in a molecular structure, and thus can be suitably applied as a composition of the reactive adhesive, especially the polyolefin-based reactive adhesive.

This polyolefin-based reactive adhesive has a high wettability to polyolefin-based substrates such as polyethylene and polypropylene among substrates, due to the alkyl groups, especially linear alkyl groups, present in the curable petroleum resins, and thus has improved adhesive force and bonding force.

Particularly, it is possible to secure an excellent adhesive force and bonding force to a polyolefin substrate which has not been subjected to the pretreatment process such as corona or plasma treatment for improving the adhesive force, and thus by excluding the pretreatment step, the production cost of various products based on polyolefin can be greatly reduced, and the process can be further simplified.

The polyolefin-based reactive adhesive can be applied to various fields such as packaging, bookbinding, paper processing field, construction and civil engineering fields, textile and leather fields, electric and electronic fields and automobile vehicles, etc.

BEST MODE

Hereinafter, the present invention will be described in more detail.

Since the polyolefin-based substrate is a typical non-polar substrate, a method of temporarily polarizing the substrate by corona treatment etc. is generally used to increase the adhesive force. However, the present invention proposes an adhesive which can be applied to a non-polar polyolefin-based substrate without expensive pre-treatment.

Adhesion refers to a state that two surfaces are attached by the attraction of molecules, atoms, and ions. An adhesive is a material that can attach two materials by interfacial attraction and requires wettability and adhesive strength. The better the wettability to the substrate is, the higher the initial adhesive area and the higher the adhesive force is. Therefore, in the present invention, a reactive adhesive composition containing a polyolefin-based polymer, which has a chemical structure similar to that of a polyolefin-based substrate, as a base polymer, is used.

The reactive polyolefin-based adhesive composition is prepared by mixing a polyolefin-based base polymer with a catalyst for the curing reaction and a petroleum resin for the increase of the adhesive force. Herein, the present invention provides a petroleum resin having a novel composition so as to be curable while having excellent adhesive force to polyolefin-based substrate, as the petroleum resin.

Petroleum Resin

Specifically, the petroleum resin according to the present invention has a copolymer type formed by copolymerizing three kinds of monomers as shown in Chemical Formula 1 below:

$$-[A]_m-[B]_n-[C]_o-$$ [Chemical Formula 1]

wherein A is a repeating unit derived from a petroleum resin monomer;

B is a repeating unit derived from a silane monomer;

C is a repeating unit derived from a C3 to C20 alpha-olefin monomer and m, n and o are each an integer of 1 or more.

Herein, the type of the copolymer is expressed as above for convenience, but is not particularly limited in the present invention. The type of the copolymer may be various forms such as a random copolymer, an alternative copolymer, a block copolymer, a graft copolymer and a starblock copolymer, and preferably may be a random copolymer.

Hereinafter, each repeating unit will be described in detail.

The first repeating unit constituting the curable petroleum resin according to the present invention is a repeating unit (A) derived from a petroleum resin monomer obtained by the cracking of naphtha, which comprises at least one ethylenically unsaturated functional group which is a polymerizable functional group in the molecular structure.

The petroleum resin monomer may be mixed C5 to C12 fractions or diolefin in liquid phase which can be practically used, and preferably mixed C5 fractions, mixed C9 fractions or diolefin.

The mixed C5 fractions may include 1-pentene, 2-methyl-2-butene n-pentane, propadiene, dicyclopentadiene, piperylene, isoprene, cyclopentene and 1,3-pentadiene etc., the mixed C9 fractions may include styrene, vinyl toluene, indene, alpha methylstyrene and benzene/toluene/xylene (BTX) etc., and the diolefin may include propadiene, dicyclopentadiene, piperylene, isoprene, cyclopentene and 1,3-pentadiene etc. Preferably, the petroleum resin monomer may comprise diolefin, more preferably dicyclopentadiene.

The second repeating unit constituting the curable petroleum resin according to the present invention together with the repeating unit (A) is a repeating unit (B) derived from a silane-based compound, which provides a reaction site for crosslinking and curing. The curing of petroleum resin is possible through crosslinking and curing, and thus when added to reactive adhesive, it is possible to further increase the adhesive force by curing rather than improving simple adhesive force.

The repeating unit (B) is preferably a compound comprising an ethylenically unsaturated functional group which is a polymerizable functional group, in the molecular structure, which is derived from a silane-based compound and represented by the following Chemical Formula (2):

[Chemical Formula 2]

wherein $R_1$ is hydrogen or methyl group;

$R_2$ to $R_4$ are the same or different from each other and represent hydrogen, a C1-C20 alkyl group, a C3-C12 cycloalkyl group, a C1-C12 alkoxy group, a C2-C12 acyloxy group, a C6-C30 aryloxy group, a C5-C30 aralkoxy group or a C1-C20 amine group;

n is an integer of 1 to 12 and x and y are 0 or 1.

Preferably, $R_1$ is hydrogen or methyl group; $R_2$ to $R_4$ are the same or different from each other and represent a C1 to C6 alkyl group or C1 to C6 alkoxy group; n is an integer of 1 to 6 and x and y are 0 or 1.

The term "alkyl" as used herein means a linear or branched saturated monovalent hydrocarbon moiety of 1 to 20, preferably 1 to 10, more preferably 1 to 6 carbon atoms. The alkyl group may be unsubstituted or further substituted by a substituent as described below. Examples of the alkyl group may include methyl, ethyl, propyl, 2-propyl, n-butyl, iso-butyl, tert-butyl, pentyl, hexyl and dodecyl etc., and also may include fluoromethyl, difluoromethyl, trifluoromethyl, chloromethyl, dichloromethyl, trichloromethyl, iodomethyl and bromomethyl etc., when further substituted with halogen.

The term "cycloalkyl" as used herein means a saturated or unsaturated, nonaromatic monovalent monocyclic, bicyclic or tricyclic hydrocarbon moiety of 3 to 12 ring carbons and may be further substituted by certain substituents as described below.

Examples of cycloalkyl may include cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (i.e., bicyclo[2,2,1]hept-5-enyl) etc.

The term "alkoxy" as used herein means a linear or branched saturated monovalent hydrocarbon moiety of 1 to 12, preferably 1 to 10, more preferably 1 to 6 carbon atoms. The alkoxy may be unsubstituted or further substituted by a substituent as described below. Examples of the alkoxy group may include methoxy, ethoxy, propoxy, isopropoxy, butoxy, pentoxy, heptoxy and dodexy etc. and also may include fluoromethoxy, difluoromethoxy, trifluoromethoxy, chloromethoxy, dichloromethoxy, trichloromethoxy, iodomethoxy and bromomethoxy etc. when further substituted with halogen.

The term "acyloxy" as used herein means a linear or branched hydrocarbon of 1 to 12, preferably 1 to 10 carbon atoms. Examples of the acyloxy may include acetoxy, ethanoyloxy, propanoyloxy, butanoyloxy, pentanoyloxy, hexanoyloxy, 2,2-dimethylpropanoyloxy and 3,3-dimethylbutanoyloxy etc. They may be further substituted by a substituent as described below.

The term "aryloxy" as used herein includes the case where oxygen is contained in a monocyclic aryl group or a polycyclic aryl group. Herein, the aryl group means an aromatic ring. Specifically, examples of the aryloxy group include, but is not limited to, phenoxy, p-tolyloxy, m-tolyloxy, 3,5-dimethyl-phenoxy, 2,4,6-trimethylphenoxy, p-tert-butylphenoxy, 3-biphenyloxy, 4-biphenyloxy, 1-naphthyloxy, 2-naphthyloxy, 4-methyl-1-naphthyloxy, 5-methyl-2-naphthyloxy, 1-anthryloxy, 2-anthryloxy, 9-anthryloxy, 1-phenanthryloxy, 3-phenanthryloxy and 9-phenanthryloxy etc.

The term "amine group" as used herein is not particularly limited in number of carbon atoms, but preferably has 1 to 30 carbon atoms. Specific examples of the amine group include, but are not limited to, methylamine group, dimethylamine group, ethylamine group, diethylamine group, phenylamine group, naphthylamine group, biphenylamine group, anthracenylamine group, 9-methyl-anthracenylamine group, diphenylamine group, phenylnaphthylamine group, ditolylamine group, phenyltolylamine group and triphenylamine group etc.

All the compounds or substituents as used herein may be substituted or unsubstituted unless otherwise specified. The term "substituted" as used herein means that hydrogen is substituted with at least one substituent selected from the group consisting of a halogen atom, a hydroxy group, a carboxyl group, a cyano group, a nitro group, an amino group, a thio group, a methyl thio group, an alkoxy group, a nitryl group, an aldehyde group, an epoxy group, an ether group, an ester group, a carbonyl group, an acetal group, a ketone group, an alkyl group, a perfluoroalkyl group, a cycloalkyl group, a heterocycloalkyl group, an allyl group, a benzyl group, an aryl group, an heteroaryl group, derivatives thereof and combinations thereof.

Specifically, the silane monomer of Chemical Formula (2) may include one selected from the group consisting of vinyltrimethylsilane, vinyltrimethoxysilane, vinyltriethoxysilane, triacetoxyvinylsilane, triphenylvinylsilane, tris(2-methoxyethoxy)vinylsilane, 3-(trimethoxysilyl)propyl methacrylate, γ-acryloxypropyl trimethoxysilane and mixtures thereof, preferably vinyltrimethoxysilane.

When the silane compound alone is copolymerized with the petroleum resin monomer, since adhesion to polyolefin-based substrate is low, an alpha-olefin monomer is used for copolymerization in the present invention, in order to improve the compatibility with the polyolefin-based substrate.

Particularly, the repeating unit (C), which is a third repeating unit constituting the petroleum resin according to the present invention, is a repeating unit derived from a C3-C20 alpha-olefin monomer, which acts to increase the adhesive force due to its high compatibility with the polyolefin substrate.

Adhesion refers to a state that two surfaces are attached by the attraction of molecules, atoms, and ions, and an adhesive is defined as a material that can attach two materials by interfacial attraction.

In order to form an adhesion which has high initial adhesion strength and is stable even after a lapse of time in the use atmosphere after the adhesion, intermolecular interfacial contact at the adhesive/adherend interface is essential, and also there should be an inherent adhesive force at the interface. In addition, the strength and property of the inherent adhesive force are very important. As such, the inherent force acting at the interface of the adhesive/adherend is referred to as an adhesion mechanism, and the adhesion mechanism to the substrate is related to the interfacial properties between the interfaces of the substrate and the adhesive, the internal cohesive force (or holding power) of the adhesive itself and the wettability.

When the adhesive material does not adhere well to the bond site due to the relative surface roughness of the mechanically treated surface, this range of intermolecular forces is considerably reduced. For this reason, the adhesive must penetrate deep into the rough surface and the surface must be fully wetted. Therefore, the strength of the adhesive depends on the penetration force of the wetting and, on the other hand, the adhesion accommodates capacity of the adherend surface. At a given surface tension of the adhesive, the wetting depends on the surface energy of the material and the viscosity of the adhesive, and the wetting is reduced when the surface is contaminated.

The better the wettability to the substrate is, the larger the initial adhesive area is and the higher the adhesive force is. At this time, the wettability is more advantageous when the molecule structure has a higher affinity with the substrate, when the Tg is lower and when the molecular weight is lower. Therefore, in the present invention, a petroleum resin is composed to have a repeating unit consisting of C3 to C20 alpha-olefin monomer in order to increase the affinity to the polyolefin-based substrate.

The C3 to C20 alpha-olefin-based monomer has one double bond in its molecular structure, and thus is polymerized by an addition reaction that causes continuously bond between neighboring molecules in the same state while the double bond is broken during copolymerization with the petroleum resin monomer and the silane monomer. As a result, a structure in which an alkyl group exists in the petroleum resin is formed. These alkyl groups are hydrophobic and flexible and have high wettability and compatibility with polyolefin-based substrates.

The alpha-olefin-based monomer used in the present invention may be a C3 to C20 linear or branched alpha-olefin based compound (or an alkene compound), preferably a C5 to C18 olefin-based compound, more preferably a linear olefin-based compound, most preferably a linear alpha-olefin-based compound.

As the olefin-based monomers that may be used, linear alpha-olefins such as ethylene (or ethene), propylene (or propene), 1-butene, 1-pentene, 1-hexene, 1-heptene, 1-octene, 1-decene, 1-undecene, 1-dodecene, 1-tetradecene, 1-hexadecene and 1-itocene, and branched alpha-olefins such as isobutylene, 3-methyl-1-butene, 2-methyl-1-butene, 3-methyl-1-butene, 4-methyl-1-butene, 3-methyl-1-pentene, 4-methyl-1-pentene, 4-methyl-1-hexene, 5-methyl-1-hexene, and the mixture thereof may be used alone or in combination, and more preferably, the linear alpha-olefins may be used.

The alpha-olefin monomer, especially the linear alpha-olefin, is more flexible than the branched alpha-olefin and has excellent flowability and structural penetration force to ensure high wettability to polyolefin-based substrate, and thus can secure high adhesive force when used as a petroleum resin of the following polyolefin reactive adhesive. Herein, as the alpha-olefin monomer, the above-mentioned monomers may be used alone or in combination of two or more, and are not particularly limited in the present invention.

The curable petroleum resin according to the present invention having the repeating unit as described above gives a proper adhesive force to the reactive adhesive composition, is curable, and is required to limit the content of each repeating unit in order to improve the adhesive force. This range of content is a range to maximize the effect that is obtained through the introduction of silane monomer and alpha-olefin monomer, especially linear alpha-olefin monomer, i.e., improvement in curability and adhesive force while maintaining the basic physical properties of petroleum resin itself. If the content of the silane-based monomer or alpha-olefin monomer is increased, the softening point and the degree of polymerization of petroleum resin are different, and thus the above-mentioned effect cannot be sufficiently secured.

Specifically, based on the total weight of the repeating unit, the repeating unit (A) may be comprised in an amount of 30 to 70% by weight, preferably 40 to 60% by weight, the repeating unit (B) may be comprised in an amount of 10 to 40% by weight, preferably 15 to 35% by weight and the repeating unit (C) may be comprised in an amount of 10 to 40% by weight, preferably 15 to 35% by weight. When the content of the repeating unit (A) is less than the above range, the desired level of adhesive force may not be obtained. On the contrary, when the content of the repeating unit (A) exceeds the above range, the content of the other repeating unit is insufficient and thus the improvement of curability and adhesive force may not be expected. In addition, when the content of the repeating unit (B) is less than the above range, problems such as deterioration of curability and prolonged curing time occur. On the contrary, when the content of the repeating unit (B) exceeds the above range, there arise problems that excessive curing may occur or control of the curing time may not be easy. In addition, when the content of the repeating unit (C) is less than the above range, the improvement of the adhesive strength to a polyolefin-based substrate may not be expected. On the contrary, when the content of the repeating unit (C) exceeds the above range, the content of the other repeating units is insufficient relatively and thus the improvement of curability and adhesive force may not be expected.

The petroleum resin according to the present invention may have a softening point of 70 to 150° C. and a weight average molecular weight of 600 to 900 g/mol.

Preparation Method of Petroleum Resin

Meanwhile, the curable petroleum resin according to the present invention is prepared by copolymerization of the petroleum resin monomer, the silane monomer and the alpha-olefin monomer as described above. Herein, the copolymerization is progressed by an addition reaction between the double bonds existing in each monomer.

The copolymerization may be carried out by various methods, and is not particularly limited in the present invention. For example, thermal polymerization, photopolymerization, ionic polymerization and radiation polymerization may be used, and preferably, thermal polymerization may be used.

The thermal polymerization may be carried out by introducing petroleum resin monomer, silane monomer and alpha-olefin monomer into a reactor, and then reacting the mixture at 150 to 300° C. for 0.5 to 10 hours, preferably 1 to 3 hours. If necessary, pressure may be applied. The application of the pressure may be carried out by installing a separate pressure application device or by performing thermal polymerization in an autoclave. Herein, the pressure may be in the range of 20 to 25 bars.

The ranges of reaction temperature, time and pressure during the thermal polymerization are optimal parameters for obtaining petroleum resin which can satisfy the physical properties (mole ratio, composition) of the above-mentioned copolymers. When the ranges of reaction temperature, time and pressure are out of the above range, there may arise problems that unreacted materials may be present in the final product or the molecular weight of the petroleum resin may be lowered. In addition, when the thermal polymerization is carried out under excessive conditions, there may arise a problem that the adhesive force may be lowered due to the occurrence of side reactions or the excessive increase in molecular weight.

In particular, the preparation of this petroleum resin may exclude the use of a thermal polymerization initiator during the thermal polymerization due to the high reactivity of each monomer and may use a reaction solvent if necessary.

The reaction solvent that can be used is a non-polymerizable solvent and propane, butane, pentane, hexane, octane, decane, dodecane, cyclopentane, methylcyclopentane, cyclohexane, methylcyclohexane, benzene, toluene, xylene, dichloromethane, chloroethane, dichloroethane, chlorobenzene and the like may be used, and preferably benzene, xylene, toluene, cyclohexane or a mixed solvent thereof may be used. Herein, the reaction solvent may be used so that the final concentration of the reactant is diluted to 30 to 70% by weight.

The petroleum resin obtained after the thermal polymerization may be subjected to conventional post-treatment processes, for example, degassing and concentrating processes to remove unreacted materials and side reaction products, and thus a curable petroleum resin to prepare in the present invention may be obtained.

The degassing process is a process for separating solid curable petroleum resin and unreacted materials and side reaction products (e.g., oligomers) and is carried out at high temperature, if necessary, under high pressure.

The degassing process is directly related to the yield and softening point of the petroleum resin and there is a tendency that the higher the degassing temperature is, the lower the yield and softening point are. However, when the degassing temperature is too low, since it is difficult to remove unreacted materials and side reaction products, the purity of the curable petroleum resin may be significantly lowered. Therefore, the degassing process should be carried out under conditions where the yield and softening point do not decrease.

Preferably, in the present invention, the degassing process may be carried out at a temperature in the range of 200 to 280° C., preferably 230 to 270° C. for 1 to 15 minutes. When the degassing is carried out at a temperature lower than the above-mentioned temperature, the purity of the curable petroleum resin may be lowered as described above. On the contrary, when the degassing is carried out above the above temperature, since the yield and softening point is decreased, physical properties (i.e., adhesive force, cohesive force) of the petroleum resin finally obtained may be lowered. Therefore, the degassing is appropriately performed within the above range.

Reactive Adhesive Composition

The above-mentioned curable petroleum resin may be applied to a variety of uses and may be cured by double bonds in the molecular structure, and thus preferably may be applicable to a reactive adhesive composition.

The reactive adhesive composition may include a polyolefin-based base polymer, a petroleum resin and a catalyst. Particularly, in the present invention, the curable petroleum resin may be used as the petroleum resin of the reactive polyolefin-based adhesive composition described above to secure a high adhesive force to various substrates.

In particular, the reactive polyolefin-based adhesive composition of the present invention has a high adhesive force, and thus the conventional pre-treatment processes (e.g., plasma treatment, corona treatment, primer treatment, etc.) for the substrate that have been performed to secure the adhesive force can be eliminated. Herein, the substrate is not particularly limited in the present invention, and may be various plastics, film, paper, nonwoven fabric, glass or metal, and preferably may be the polyolefin-based resin used as the interior material of the automobile among the above-mentioned plastics.

Preferably, the reactive polyolefin-based adhesive composition according to the present invention may comprise 70 to 95% by weight, preferably 75 to 90% by weight of the polyolefin-based base polymer, 5 to 30% by weight, preferably 10 to 25% by weight of the curable petroleum resin and 0.1 to 10% by weight, preferably 0.5 to 5% by weight of the catalyst based on the total weight of the composition.

When the amount of the curable petroleum resin is less than the above range, the effect of improvement in adhesion performance may not be expected. On the contrary, when the content of the curable petroleum resin exceeds the above range, since the content of the other composition is reduced, the function as a reactive adhesive composition may not be satisfactorily performed. At this time, the content of other polyolefin-based base polymers and catalysts are limited so that the function of each composition could be fully demonstrated.

The polyolefin-based base polymer constituting the reactive polyolefin-based adhesive composition is not particularly limited in the present invention, and may be a polymer commonly used in this field.

For example, the polyolefin-based base polymer may be polyalpha-olefin, polyolefin alone, a copolymer thereof or a blend thereof. The polyalpha-olefin may be one prepared by copolymerizing linear alpha-olefins such as 1-butene, 1-pentene, 1-hexene, 1-heptene, 1-octene, 1-decene, 1-undecene, 1-dodecene, 1-tetradecene, 1-hexadecene and 1-itocene. The polyolefin may be polyethylene, polypropylene alone or a copolymer thereof. If desired, the polyalpha-olefin and polyolefin may be used as it is, or may be one modified with silane.

The above-mentioned polyolefin-based base polymer may be directly manufactured or commercially available. For example, the silane modified polyalpha-olefin may be VESTOPLAST (e.g., VESTOPLAST 206V, VESTOPLAST 2412) product from Evonik Degussa GmbH and the like, the silane modified polyolefin may be LICOCENE PP SI 1362 TP product from Clariant AG and the like, and the ethylene alpha-olefin may be VISTAMAXX 6102 (propylene-based elastomers), EXACT 5008 (ethylene-butene copolymer), and EXACT 3031 (ethylene-hexene copolymer) products from ExxonMobil Chemical Co., and ENGAGE (e.g., ENGAGE 8200) product from Dow Chemical Co. and the like The curing catalyst may be added to control the curing rate. In embodiments, a phosphine-based catalyst, a boron-based catalyst, an imidazole-based catalyst or a mixed catalyst thereof may be used.

The phosphine-based curing catalyst may be, but is not limited to, triphenylphosphine, tri-o-tolylphosphine, tri-m-tolylphosphine, tri-p-tolylphosphine, tri-2,4-xylylphosphine, tri-2,5-xylylphosphine, tri-3,5-xylylphosphine, tribenzylphosphine, tris(p-methoxyphenyl)phosphine, tris(p-tert-butoxyphenyl)phosphine, diphenylcyclohexylphosphine, tricyclohexylphosphine, tributylphosphine, tri-tert-butylphosphine, tri-n-octylphosphine, diphenylphosphinostyrene, diphenylphosphinouschloride, tri-n-octylphosphine oxide, diphenylphosphinyl hydroquinone, tetrabutylphosphonium hydroxide, tetrabutylphosphonium acetate, benzyltriphenylphosphonium hexafluoroantimonate, tetraphenylphosphonium tetraphenylborate, tetraphenylphosphonium tetra-p-tolylborate, benzyltriphenylphosphonium tetraphenylborate, tetraphenylphosphonium tetrafluoroborate, p-tolyltriphenylphosphonium tetraptolylborate, triphenylphosphine triphenylborane, 1,2-bis(diphenylphosphino)ethane, 1,3-bis(diphenylphosphino)propane), 1,4-bis(diphenylphosphino)butane and 1,5-bis(diphenylphosphino)pentane. These materials may be used alone or in combination of two or more.

The boron-based curing catalyst may be, but is not limited to, phenyl boronic acid, 4-methylphenyl boronic acid, 4-methoxyphenyl boronic acid, 4-trifluoromethoxyphenyl boronic acid, 4-tert-butoxyphenyl boronic acid, 3-fluoro-4-methoxyphenyl boronic acid, pyridine-triphenylborane, 2-ethyl-4-methyl imidazolium tetraphenylborate and 1,8-diazabicyclo[5.4.0]undecene-7-tetraphenylborate. These catalysts may be used alone or in combination of two or more.

In addition, the reactive polyolefin-based adhesive composition according to the present invention may appropriately comprise at least one additive selected from the group consisting of silane coupling agents, fillers, flame retardants, pigments, antioxidants, ultraviolet stabilizers, dispersants, defoamers, thickeners, plasticizers, tackifier resins and combinations thereof.

For example, the silane coupling agent may be an epoxy-containing silane or a mercapto-containing silane. The epoxy-containing silane coupling agent may be 2-(3,4-epoxy cyclohexyl)-ethyltrimethoxysilane, 3-glycidoxy trimethoxysilane, 3-glycidoxy propyl triethoxysilane, 3-glycidoxy propyl triethoxysilane, and the amine group-containing silane coupling agent may be N-2(aminoethyl)3-aminopropylmethyldimethoxysilane, N-2(aminoethyl)3-aminopropyltrimethoxysilane, N-2(aminoethyl)3-aminopropyltriethoxysilane, 3-aminopropyltrimethoxysilane, 3-aminopropyltriethoxysilane, 3-triethoxysilyl-N-(1,3-dimethylbutylidene)propylamine and N-phenyl-3-aminopropyltrimethoxysilane, but is not limited thereto. These coupling agents may be used alone or in combination of two or more.

The mercapto-containing silane coupling agent may be 3-mercaptopropylmethyldimethoxysilane, 3-mercaptopropyltriethoxysilane, and the isocyanate-containing silane coupling agent may be 3-isocyanatepropyltriethoxysilane, but is not limited thereto. These coupling agents may be used alone or in combination of two or more.

The filler may be an inorganic filler or an organic filler as needed.

The inorganic filler may be, but is not limited to, metal components such as gold powder, silver powder, copper powder or nickel, or non-metal components such as alumina, aluminum hydroxide, magnesium hydroxide, calcium carbonate, magnesium carbonate, calcium silicate, magnesium silicate, calcium oxide, magnesium oxide, aluminum oxide, aluminum nitride, silica, boron nitride, titanium dioxide, glass, iron oxide, and ceramics. These fillers may be used alone or in combination of two or more.

The organic filler may be, but is not limited to, carbon, rubber-based filler, polymer-based filler, or the like. These fillers may be used alone or in combination of two or more.

A particle size of the filler may be from about 10 nm to about 10 μm, preferably from about 100 nm to about 7 μm. No collision with the semiconductor circuit occurs in the above range, and the circuit is not damaged.

The reactive polyolefin-based adhesive composition comprising the above-mentioned composition may be obtained by kneading each of the above components, for example, using a kneader such as a plastomill, Banbury mixer, roll, internal mixer.

The reactive polyolefin-based adhesive composition proposed in the present invention may be cured by thermal curing. The room temperature or thermal curing may be carried out at about 20 to 100° C. and may be carried out for 30 seconds to 72 hours depending on the conditions.

In particular, the reactive polyolefin-based adhesive composition is not limited in terms of materials and shapes thereof, and may be used in any field requiring adhesive ability. For example, it may be applied to various materials such as non-ferrous metal, rubber, plastic, fiber, wood, leather, ceramic, paper and glass. Especially, it may be suitably used when the material is plastic, and be polyolefin-based material among them, preferably polyethylene or polypropylene material.

More preferably, the reactive polyolefin-based adhesive composition of the present invention may be applied to the interior material of the automobile using polyolefin-based materials such as polyethylene or polypropylene.

MODE FOR INVENTION

Examples

Hereinafter, the present invention will now be described in more detail with reference to Examples. However, the following Examples should not be construed as limiting the scope of the present invention, and should be construed to facilitate understanding of the present invention.

Preparation Example 1: Preparation of Petroleum Resin A 272.2 g of dicyclopentadiene (DCPD, Kolon Industries, purity of 77.14%), 60 g of vinyltrimethoxysilane (TMVS, Aldrich product, purity of 99.99%), and 30 g of 1-hexene (Aldrich product, purity of 99.99%) together with 237.7 g of Hysol as a solvent (used as a solvent in the process product using a non-polymerized naphthenic substance as a main component of Kolon Industries) were added to the autoclave in such an amount that the total amount of the three components was measured to be 60% of the capacity of a 1 L autoclave as a reactor. After the raw materials were charged, the reactor was tightened, and it was substituted with nitrogen in order to remove unnecessary reaction such as reaction with oxygen at a high temperature, and the reactor was forced to be in slight pressurized state.

The temperature of the reactor was raised to 275° C. When the reaction temperature was reached, the reaction time was measured and the reaction was allowed to proceed for 1 hour. At this time, the inside of the reactor was pressurized to 10 bars while purging with nitrogen, and stirring was carried out at 300 rpm. When the reaction was completed, it was set at room temperature and cooled. After cooling to no more than 30° C., the internal pressure was depressurized and the reactor was opened to obtain a polymer.

Since unreacted materials and solvents were contained in the polymerization product, in addition to the polymerized materials, these materials were removed. Specifically, all the polymerization product was charged into a 1 L glass four-necked kettle, and a vacuum was applied at room temperature. The vacuum was maintained at 1 bar, and when a vacuum was applied, the temperature was raised to 240° C. with stirring. When the temperature reached 240° C., the measurement of condensation time was started and it was maintained for 10 minutes. When the concentration was completed, the vacuum was released and the molten resin fraction was recovered.

Preparation Example 2: Preparation of Petroleum Resin B

A petroleum resin B was prepared in the same manner as Preparation Example 1 except that 1-octene was used as the monomer.

Preparation Example 3: Preparation of Petroleum Resin C

A petroleum resin C was prepared in the same manner as Preparation Example 1 except that 1-dodecene was used as the monomer.

Preparation Example 4: Preparation of Petroleum Resin D

A petroleum resin D was prepared in the same manner as Preparation Example 1 except that petroleum resin monomer alone was used.

The contents of each composition used in Preparation Examples 1 to 4 were shown in Table 1 below.

Experimental Example 1: Analysis of Physical Properties of Curable Petroleum Resin The physical properties of the petroleum resin prepared in Preparation Examples 1 to 4 were measured, and the results were shown in Table 2 below. The evaluation methods of physical properties were as follows.

(1) Yield: Percentage of residual resin after concentration, relative to the weight after polymerization obtained from the polymerization.

(2) Softening point: Measured according to ASTM E 28 standard. The sample was allowed to melt and poured into a circular disk, and then when the resin was hardened, it was mounted on a softening point measuring instrument, and the iron ball was placed on the hardened resin, and the temperature at which the resin was melted and thus the iron ball falls was measured.

(3) Molecular weight: Weight average molecular weight (Mw), number average molecular weight (Mn) and Z-average molecular weight (Mz) converted in terms of polystyrene were determined by gel permeation chromatography (Waters, Waters 707). The polymer to be measured was dissolved in tetrahydrofuran so as to have a concentration of 4000 ppm, and 100 μl of solution was injected into GPC. The mobile phase of GPC was tetrahydrofuran and was flowed at a flow rate of 1.0 mL/min and analysis was performed at 35° C. The column was connected in series with four Waters HR-05,1,2,4E. RI and PAD Detector were used as the detector and measured at 35° C. At this time, the PDI (polydispersity index) was calculated by dividing the measured weight average molecular weight by the number average molecular weight.

TABLE 2

| | Yield (%) | Softening point (° C.) | Molecular weight (g/mol) | | | |
|---|---|---|---|---|---|---|
| | | | Mn | Mw | Mz | MWD |
| Preparation Example 1 | 37.8 | 87.1 | 404 | 667 | 1061 | 1.815 |
| Preparation Example 2 | 40.3 | 87.7 | 407 | 699 | 1158 | 1.881 |
| Preparation Example 3 | 43.1 | 85.6 | 454 | 787 | 1269 | 1.903 |
| Preparation Example 4 | 41 | 90 | 390 | 734 | 1405 | 1.84 |

Examples 1 to 3, Comparative Examples 1 and 2: Preparation of Reactive Adhesive Composition Reactive adhesive compositions were prepared using petroleum resins prepared in Preparation Examples 1 to 4 above.

TABLE 1

| | | | | Preparation Example 1 | Preparation Example 2 | Preparation Example 3 | Preparation Example 4 |
|---|---|---|---|---|---|---|---|
| Monomer | Input (g) | C5-DCPD | | 272.2 | 272.2 | 272.2 | 388.9 |
| | | TMVS | | 60.0 | 60.0 | 60.0 | — |
| | | Alpha-olefin | 1-hexene | 30.0 | — | — | — |
| | | | 1-octene | — | 30.0 | — | — |
| | | | 1-dodecene | — | — | 30.0 | — |
| | | Solvent | | 237.7 | 237.7 | 237.7 | 211.1 |
| | Concentration of monomer (wt. %) | | | 50.00 | 50.00 | 50.00 | 50.00 |

Reactive adhesive compositions were prepared by adding petroleum resins of Preparation Examples 1 to 4 as a base polymer and catalyst to a mixer, followed by stirring them. At this time, the materials used were Si-APAO (Vestoplast 206, Evonik) and Si-PP (Licocene PP SI 1362, Clariant), and the catalyst was Hordaphos (Clariant), a phosphorus-based catalyst.

TABLE 3

| | Base polymer | | Petroleum resin | | | | Catalyst |
|---|---|---|---|---|---|---|---|
| | Si-APAO | Si-PP | Preparation Example 1 | Preparation Example 2 | Preparation Example 3 | Preparation Example 4 | |
| Example 1 | 50 g | 30 g | 20 g | — | — | — | 0.5 g |
| Example 2 | 50 g | 30 g | — | 20 g | — | — | 0.5 g |
| Example 3 | 50 g | 30 g | — | — | 20 g | — | 0.5 g |
| Comparative Example 1 | 50 g | 30 g | — | — | — | — | 0.4 g |
| Comparative Example 2 | 50 g | 30 g | — | — | — | 20 g | 0.5 g |

Experimental Example 2: Evaluation of Physical Properties of Reactive Adhesive Composition After applying the reactive adhesive compositions prepared in the Examples and Comparative Examples to the substrate, the physical properties as shown below were measured, and the results were shown in Table 4 below.

(1) Lap Shear Adhesion Strength, Kgf

To evaluate the lap shear adhesion strength, the curing was performed after application of the reactive adhesive composition quantitated between two cut polypropylene specimens (1 inch*6 inches) (application area: 1 inch×1 inch).

The curing was carried out at room temperature (25° C.) and humidity (60~70%) for 2 weeks, and then the maximum stress (intensity) was measured using an Instron tester, and a total of 5 tests were performed to obtain an average value.

(2) Shear Adhesion Failure Temperature (SAFT), ° C.

The shear adhesion failure temperature was measured using shear adhesion failure tester. This test was a test to measure the ability to withstand depending on the time and temperature under shear stress, by applying the adhesive to the polypropylene specimen (3 inches×2 inches) in a 1 inch×1 inch size, attaching the polypropylene specimen (3 inches×1 inch) and then curing, hanging a 1 kg weight on one substrate (3 inches×1 inch), and measuring the limit temperature to withstand while gradually increasing the temperature at a rate of 0.4° C. per minute starting from 40° C. At this time, the higher the holding temperature is, the better the heat resistance is.

(3) Holding Power Test, Min

This holding power test was a test to test the holding power of the adhesive composition, by applying an adhesive between the substrates and then curing (specific specimen production method was the same as SAFT), hanging a 1 kg weight on one substrate, and measuring the limit temperature to withstand at the temperature of 80° C. At this time, the higher the holding power is (the longer the time is), the better the cohesive force is.

In this case, the values in Table 4 below were relative values when the pre-curing value of Comparative Example 1 without petroleum resin was taken as 100%.

TABLE 4

| | Shear bond strength | | SAFT | | Holding power | |
|---|---|---|---|---|---|---|
| | After curing (kgf) | Rate of increase (%) | After curing (° C.) | Rate of increase (%) | After curing (min) | Rate of increase (%) |
| Example 1 | 115.39 | 15.39 | 108.89 | 8.89 | 833.33 | 733.33 |
| Example 2 | 130.77 | 30.77 | 105.56 | 5.56 | 833.33 | 733.33 |
| Example 3 | 123.08 | 23.08 | 127.78 | 27.78 | 833.33 | 733.33 |
| Comparative Example 1 | 100 | 0 | 100 | 0 | 100 | 0 |
| Comparative Example 2 | 65.38 | −34.62 | 91.11 | −8.89 | 66.67 | −33.33 |

Referring to Table 4, it was seen that when the petroleum resin according to the present invention was used, the rate of increase in shear bond strength, SAFT, and holding power were improved as compared to Comparative Example 1.

Particularly, in the case of the composition of Comparative Example 2 using base polymer and petroleum resin alone, rather, the shear bond strength, SAFT and holding power were significantly decreased compared with Comparative Example 1 using only base polymer.

(4) Measurement of Contact Angle

Figure 1A:
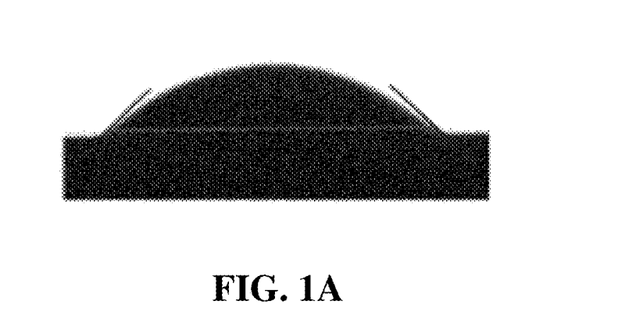
FIGS. 1A to 1D show the results of the measurement of the contact angle wherein 1A is Comparative Example 1, 1B is Example 1, 1C is Example 2, and 1D is Example 3.
Figure 1B:
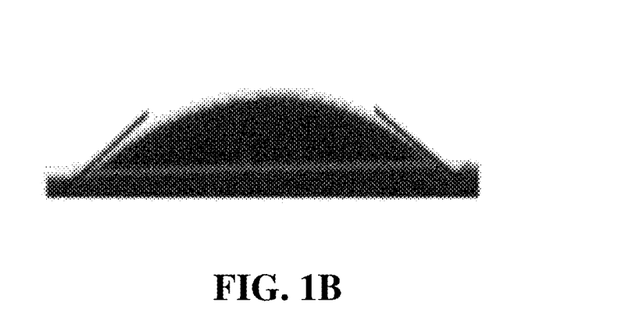
Figure 1C:
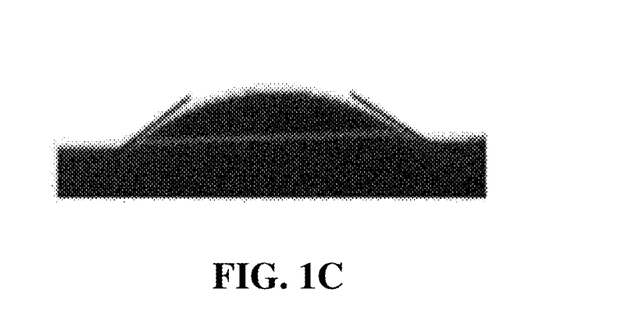
Figure 1D:
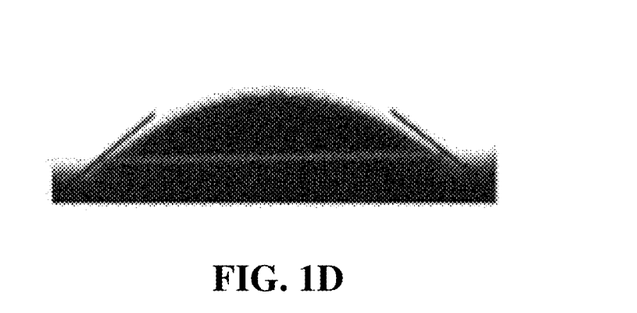

The contact angle was measured by dissolving the combined compound with xylene in a ratio of 1:1, and then measuring the angle with a contact angle meter. The obtained results were shown in Table 5 and FIGS. 1A to 1D. FIGS. 1A-1D show the result of measurement of the contact angle, wherein FIG. 1A is Comparative Example 1, FIG. 1B is Example 1, FIG. 1C is Example 2, and FIG. 1D is Example 3.

TABLE 5

|  | Comparative Example 1 | Example 1 | Example 2 | Example 3 |
|---|---|---|---|---|
| Contact angle (°) | 35.4 | 26.9 | 22.7 | 24.1 |

Referring to Table 1 and FIGS. 1A to 1D, it was seen that when the silane monomer and alpha-olefin monomer were copolymerized as described in Examples 1 to 3, the contact angle was lowered relative to the composition of Comparative Example 1. At this time, the contact angle was decreased with increasing the number of carbon atoms of alpha-olefin, and when using octene, the best results were obtained FIG. 2 is a graph showing the relationship between the contact angle and the shear bond strength.

Figure 2:
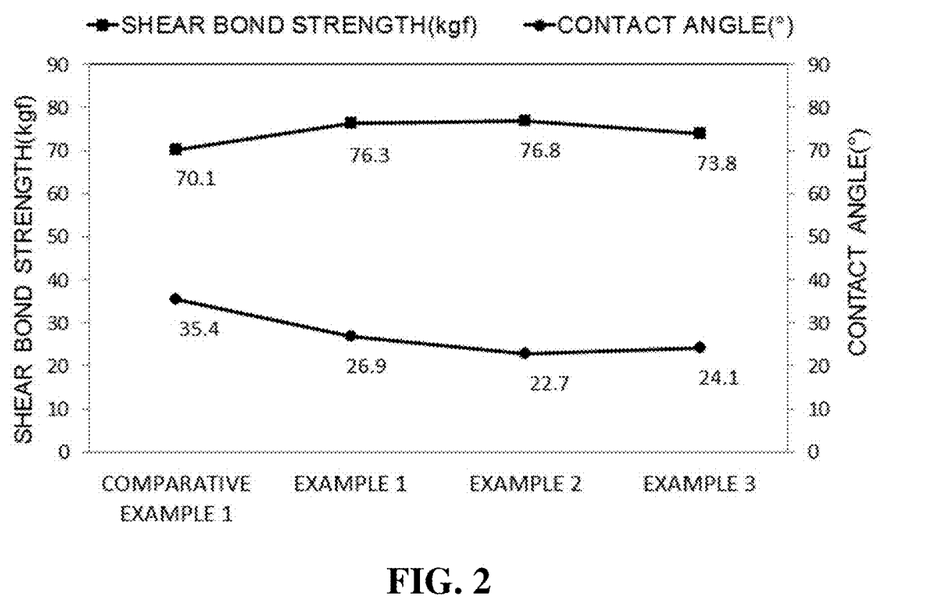
FIG. 2 is graphs showing the relationship between the contact angle and shear bond strength of the compositions of Examples and Comparative Examples measured in Experimental Example 2 of the present invention.

Referring to FIG. 2, it was seen that when the silane monomer and the alpha-olefin monomer were copolymerized according to the present invention, the wettability with the substrate was improved, and thus the initial shear bond strength was increased and finally the shear bond strength after final curing was increased. In particular, when octene was used as alpha-olefin monomer as in Example 2, high contact shear bond strength along with low contact angle was obtained.

INDUSTRIAL AVAILABILITY

The curable petroleum resin according to the present invention can be suitably applied as an additive composition of a reactive adhesive composition.

The invention claimed is:

1. A curable petroleum resin comprising:
a repeating unit (A) derived from a petroleum resin monomer;
a repeating unit (B) derived from a silane monomer and
a repeating unit (C) derived from a C3-C20 alpha-olefin monomer.

2. The curable petroleum resin according to claim 1, wherein the alpha-olefin monomer comprises one selected from the group consisting of propene, 1-butene, 1-pentene, 1-hexene, 1-heptene, 1-octene, 1-decene, 1-undecene, 1-dodecene, 1-tetradecene, 1-hexadecene, 1-itocene and combinations thereof.

3. The curable petroleum resin according to claim 1, wherein the alpha-olefin monomer comprises one selected from the group consisting of isobutylene, 3-methyl-1-butene, 2-methyl-1-butene, 3-methyl-1-butene, 4-methyl-1-butene, 3-methyl-1-pentene, 4-methyl-1-pentene, 4-methyl-1-hexene, 5-methyl-1-hexene, 3,3-dimethyl-1-pentene, 3,4-dimethyl-1-pentene, 4,4-dimethyl-1-pentene and combinations thereof.

4. The curable petroleum resin according to claim 1, wherein the petroleum resin monomer comprises one selected from the group consisting of mixed C5 fractions, mixed C9 fractions, dicyclopentadiene and mixtures thereof obtained by the cracking of naphtha.

5. The curable petroleum resin according to claim 1, wherein the silane monomer is represented by the following Chemical Formula (2):

$$CH_2=C(R1)-(COO)_x(C_nH_{2n})_ySi(R2)(R3)(R4) \quad \text{[Chemical Formula 2]}$$

wherein R1 is hydrogen or methyl group;
R2 to R4 are the same or different from each other and represent hydrogen, a C1-C20 alkyl group, a C3-C12 cycloalkyl group, a C1-C12 alkoxy group, a C2-C12 acyloxy group, a C6-C30 aryloxy group, a C5-C30 aralkoxy group or a C1-C20 amine group;
n is an integer of 1 to 12 and
x and y are 0 or 1.

6. The curable petroleum resin according to claim 5, wherein R1 is hydrogen or methyl group; R2 to R4 are the same or different from each other and represent a C1 to C6 alkyl group or C1 to C6 alkoxy group; n is an integer of 1 to 6 and x and y are 0 or 1.

7. The curable petroleum resin according to claim 1, wherein the silane monomer comprises one selected from the group consisting of vinyltrimethylsilane, vinyltrimethoxysilane, vinyltriethoxysilane, triacetoxyvinylsilane, triphenylvinylsilane, tris(2-methoxyethoxy)vinylsilane, 3-(trimethoxysilyl)propyl methacrylate, γ-(meth)acryloxypropyl trimethoxysilane and mixtures thereof.

8. The curable petroleum resin according to claim 1, wherein the curable petroleum resin comprises 30 to 70% by weight of a repeating unit (A) derived from a petroleum resin monomer; 10 to 40% by weight of a repeating unit (B) derived from a silane monomer and 10 to 40% by weight of a repeating unit (C) derived from a C3-C20 alpha olefin monomer, based on the total weight of the repeating unit.

9. The curable petroleum resin according to claim 1, wherein the curable petroleum resin has a softening point of 70 to 150° C. and a number average molecular weight (Mn) of 600 to 900 g/mol.

10. A reactive adhesive composition comprising:
a polyolefin-based base polymer;
a petroleum resin and
a catalyst,
wherein the petroleum resin is a curable petroleum resin according to 1.

11. The reactive adhesive composition according to claim 10, wherein the reactive adhesive composition comprises 70 to 94% by weight of the polyolefin-based base polymer; 5 to 30% by weight of the petroleum resin and 0.1 to 10% by weight of the catalyst, based on the total weight of the composition.

12. The reactive adhesive composition according to claim 10, wherein the polyolefin-based base polymer comprises one selected from the group consisting of polyalpha-olefin, polyolefin alone, copolymers thereof or blends thereof.

* * * * *